No. 832,298. PATENTED OCT. 2, 1906.
E. B. CRAMBLIT.
BOTTLE FILLING MACHINE.
APPLICATION FILED NOV. 28, 1905.
3 SHEETS—SHEET 1.
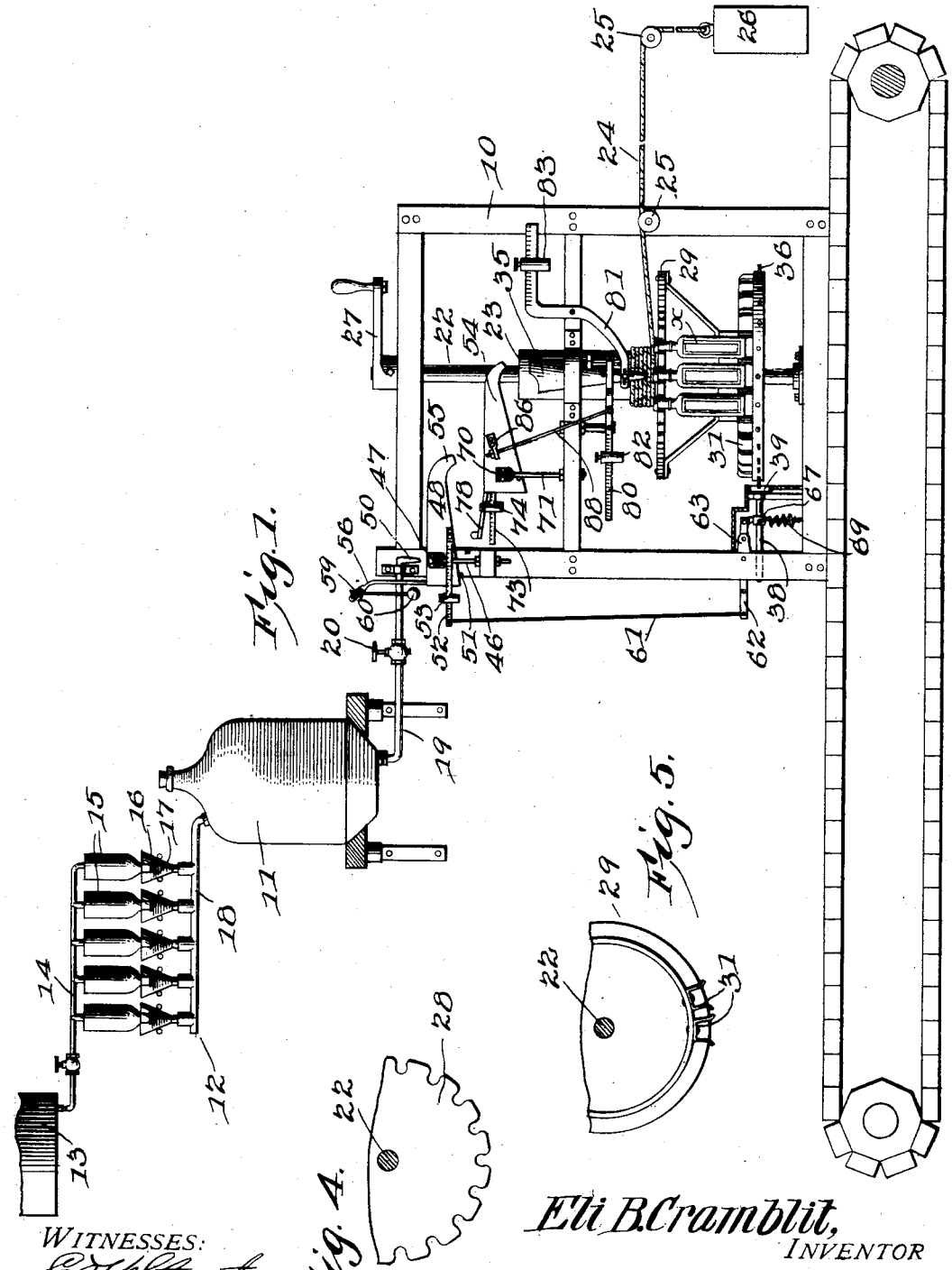
Eli B. Cramblit,
INVENTOR
WITNESSES:
By C. A. Snow & Co.
ATTORNEYS

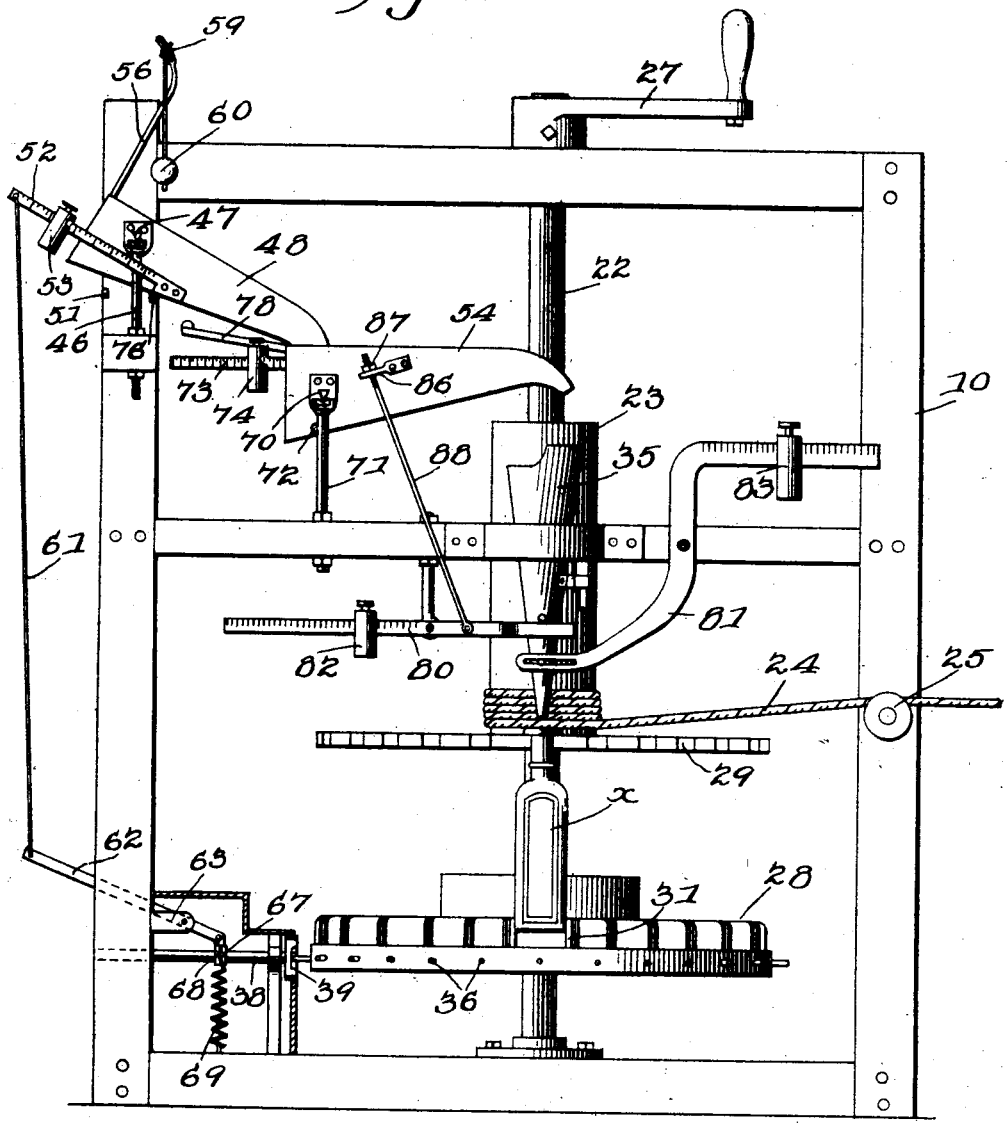

No. 832,298.    PATENTED OCT. 2, 1906.
E. B. CRAMBLIT.
BOTTLE FILLING MACHINE.
APPLICATION FILED NOV. 28, 1905.
3 SHEETS—SHEET 3.
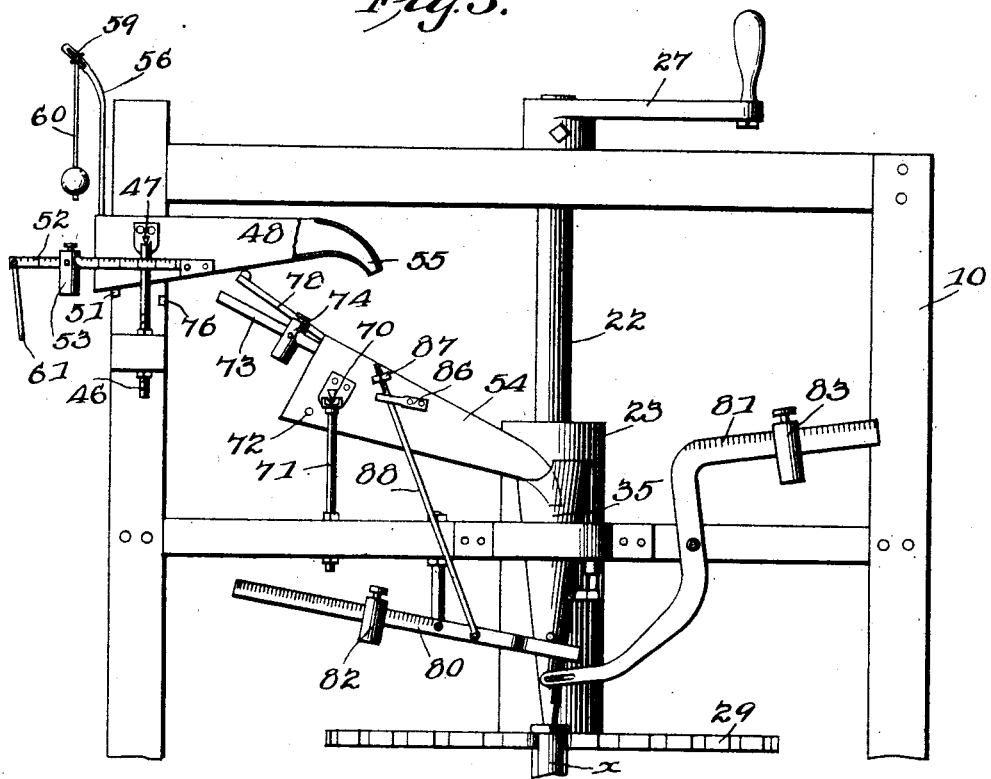
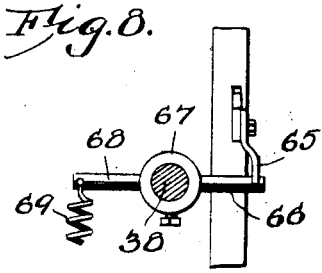
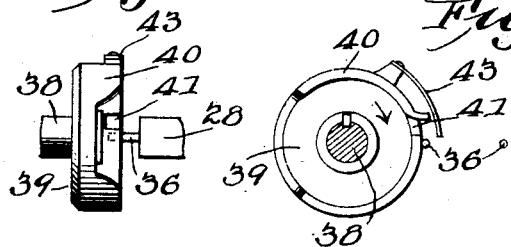
WITNESSES:
Eli B. Cramblit,
INVENTOR.
By C. A. Snow & Co.
ATTORNEYS

UNITED STATES PATENT OFFICE.

ELI B. CRAMBLIT, OF AMES, IOWA.

BOTTLE-FILLING MACHINE.

No. 832,298.  Specification of Letters Patent.  Patented Oct. 2, 1906.

Application filed November 28, 1905. Serial No. 289,519.

*To all whom it may concern:*

Be it known that I, ELI B. CRAMBLIT, a citizen of the United States, residing at Ames, in the county of Story and State of Iowa, have invented a new and useful Bottle-Filling Machine, of which the following is a specification.

This invention relates to bottle-filling machines, and has for its principal object to provide an automatic mechanism whereby bottles may be filled with liquid or other material without danger of overfilling or wasting any of such material.

A further object of the invention is to provide a bottle-filling machine in which each bottle will receive precisely the same weight of material.

A still further object of the invention is to provide a bottle-filling machine in which the material is weighed in advance of its admission to the bottle, the material being divided into charges that are successively poured into the bottles.

A still further object of the invention is to provide an automatically-movable bottle-carrier, the operation of which is controlled by the weight of material prior to its entrance into the bottle.

A still further object of the invention is to provide a bottle-filling machine in which the liquid is allowed to flow into a primary bucket until a given quantity of liquid has collected therein, the bucket then descending and controlling the movement of the bottle-carrier and the liquid being poured into a secondary bucket where the final weight is received, and at the completion of the final weight the liquid is poured into the bottle.

A still further object of the invention is to provide a weighing apparatus including tiltable primary and secondary load-receiving buckets, in which the primary bucket tilts to discharge into the secondary bucket after receiving a predetermined weight less than the final weight and remains in such position to form a guide for the passage of the remaining portion of the load to the secondary bucket, and, further, to provide in this connection for the return of the primary bucket to its initial receiving position on the tilting of the secondary bucket.

A still further object of the invention is to provide a weighing mechanism in which primary and secondary buckets or receivers are employed and the material is allowed to flow in a continuous uninterrupted stream into the primary bucket, the latter dumping at intervals to discharge its contents into the secondary bucket.

A still further object of the invention is to provide a bottle-filling machine in which a counterweighted funnel is employed immediately over the bottle to be filled and is moved into the bottle automatically by the bucket containing the charge to be emptied into said bottle.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is an elevation of a bottle-filling machine constructed in accordance with the invention and illustrating the employment of filters in advance of the weighing appliance. Fig. 2 is an elevation of the weighing and bottling machine proper, showing the primary bucket or receptacle in dumping position. Fig. 3 is a view similar to Fig. 2, illustrating the main portions of the weighing mechanism, the secondary or final receptacle being shown in dumping position. Fig. 4 is a plan view of a portion of the notched disk in which the necks of the bottles are carried. Fig. 5 is a similar view showing the lower disk for receiving the bottoms of the bottles. Fig. 6 is a front elevation of the controlling device for permitting step-by-step rotative movement of the bottle-carrier. Fig. 7 is a side elevation of the same. Fig. 8 is a detail view of the connections through which said controlling device is actuated.

Similar characters of reference are employed to indicate corresponding parts throughout the several figures of the drawings.

The working parts of the apparatus are supported upon a suitable frame 10, and at a point above and to one side of the frame is a containing vessel 11, into which the material to be bottled is delivered from a bank of filters 12. The filters receive the liquid from an elevated mixing-tank 13 and said liquid flows through a valved pipe 14 to a plurality of inverted containers 15, the mouths of which extend into funnel-shaped casings 16, that are arranged to carry filtering material, as 17. The liquid flows from the filters through a pipe 18 to the receptacle 11 and thence through a pipe 19 to the weighing apparatus. In the pipe 19 is arranged a valve 20, which may be turned for the purpose of controlling the speed of flow of the liquid, and the speed of operation of the bottling mechanism is thus placed under the control of the valve.

The frame 10 is provided with bearings for the reception of a vertically-disposed shaft 22, carrying a drum 23, on which is wound a cable or chain 24, the end of the cable or chain passing over guiding-sheaves 25 and being connected to an operating-weight 26, which in descending by gravity tends to revolve the shaft 22. At the upper end of the shaft is a cranked operating-handle 27, which may be turned for the purpose of winding up the cable at intervals.

Secured to the shaft are two disks 28 and 29, that form supports and guides for the bottles x. The upper disk 29 is provided with peripheral pockets for the reception of the necks of the bottles, and the lower disk 28 carries pockets 31, preferably formed of thin strips of metal bent to conform and arranged to engage with the lower portions of the bottles. The shaft is revolved in order to bring the bottles successively in vertical alinement with a funnel 35, through which the liquid or other material is poured into the bottle.

Extending from the periphery of the lower disk 28 is an annular series of pins 36, of a number equal to the number of pockets 31, and these pins are engaged by a controlling device in such manner as to permit a step-by-step rotative movement of the disk under the influence of the weighted cable or chain 24. This controlling mechanism includes a horizontally-disposed shaft 38, having at one end a disk 39, that is provided with a flange 40, having an opening 41, through which the pins 36 may successively pass. One of the pins is always held against the outer face of the flange, and when the disk is turned in the direction indicated by the arrow the opening will be moved into alinement with said pin, so that the latter may pass through the opening as the disk 28 rotates, while the next succeeding pin will move into engagement with a yieldable strip 43, that is carried by the disk 40 and extends over the opening 41, so that only a single pin may pass through said opening. On movement of the disk 39 in the reverse direction the second pin, which previously rested against the strip 43, will be allowed to move against the outer face of the flange 40 in readiness to enter the opening 41 when disk 39 is again moved in the first direction. The oscillatory movement of the shaft 38 is under the control of the mechanism by which the successive charges of liquid or other material are weighed prior to their introduction into the bottle.

At the upper portion of one side of the frame are arranged standards 46, having bearings for the reception of knife-edge pivots 47, projecting from the opposite sides of a primary weighing-receptacle 48, said receptacle being in the form of a tiltable bucket that normally is in the position indicated in dotted lines in Fig. 2 and full lines in Fig. 3, and at the end of the pipe 19 is a downwardly-directed nozzle 50, through which the liquid pours in an uninterrupted stream into said bucket so long as the valve is open. When in normal position, the rear end of the bucket rests against a fixed stop 51 and is held against said stop by the weight of a beam 52 and a counterpoise 53, the latter being slidable on the beam in order to adjust the operative load, or the weight under which the bucket should tilt from the dotted-line position Fig. 2 to the full-line position of the same figure, and when tilted the bucket will discharge its contents into a secondary or final weighing-bucket 54. In order to prevent splashing of the liquid, the discharge end of the bucket 48 is preferably covered in order to form a tube 55, so that the liquid directed toward the discharge end of said bucket will not be carried outward beyond the end of the lower bucket 54.

Extending from the counterpoise side of the bucket is a vertically-disposed arm 56, having an outwardly-curved upper end in which is a slit for the reception of a screw 59, which may be adjusted to any desired position in the length of the slot. On this screw is hung a pendulum-weight 60, that tends normally to retain the primary bucket in the horizontal load-receiving position; but when the bucket tilts to the full-line position (shown in Fig. 2) the weight crosses the vertical plane of the center of gravity of the bucket and its counterpoise means and moves toward the discharge side of the bucket, and thereafter tends to maintain said primary bucket in the discharging position, said bucket being held in this position until all of its contents are discharged into the secondary bucket 54 and for a sufficient length of time after that to permit the accumulation of the final weight in the bucket 54, the primary bucket 48 acting at this time as a duct or conveyer between the nozzle 50 and the secondary bucket.

The outer end of the counterpoise-arm 52 is connected by a rod 61 to a lever 62, that is fulcrumed on a bracket 63, near the base of the frame. The opposite end of this lever is connected by a link 65 to a rocker-arm 66, projecting from a collar 67, that is rigidly secured to the rock-shaft 38, and the collar 67 carries a second arm 68, that is connected by a spring 69 to a fixed point. The tilting movement of the primary bucket 48 is transmitted to the lever 62 and thence to the shaft 48, which is rocked to an extent sufficient to move the flange 40 until pin 36 enters the opening 41. When the primary bucket is again restored to its initial position in the manner hereinafter described, the spring 69 serves to rock the shaft 38 in the reverse direction and allow the second pin 36 of disk 38 to move from engagement with the strip 43 into contact with the outer face of the flange 40.

The secondary receptacle or bucket 54 has knife-edge pivots 70, resting on brackets 71, that are carried by the frame, and said bucket is held in a position at rest or load-receiving position with a stop-pin 72 against one of the brackets 71 by means of a counterpoise-arm 73 and an adjustable poise 74, mounted on said arm, and this counterpoise is carefully adjusted, so that said secondary bucket will not tilt until it has nearly received the final load, while the bucket 48 is so adjusted as to tilt when it has received approximately two-thirds of the load. When the bucket 48 moves to discharging position, it comes to a position at rest against a fixed stop 76, so that no portion of its weight is imposed on the secondary bucket 54 and the contents of the primary bucket will flow rapidly into the secondary bucket, and then said primary bucket will act as a duct or conveyer to direct the stream of fluid from the nozzle into said secondary bucket. When the latter receives the full load or nearly the full load, it tilts to discharging position, as shown in Fig. 3, and its contents flow through the funnel 35 into the bottle.

Extending from the counterpoise side of the bucket 54 is a yieldable arm 78, which is disposed some distance below the bucket 48 when the latter is in discharging position. As soon as the bucket 54 moves to discharging position its arm 78 engages against the bottom of the bucket 48 and throws the latter up to its initial position. It is not necessary to elevate the bucket 48 throughout the entire movement, but the impetus given must be sufficient to shift the pendulum-weight 60 to the poise side of the center of gravity of the upper bucket and its poising devices, so that said upper bucket will then move to the initial approximately horizontal position, (shown in full lines in Fig. 3,) and a second charge of liquid will be accumulated therein during the time the first charge is being poured into the bottle from the bucket 54.

The funnel 35 is mounted in suitable guides in the frame, and is supported in elevated position by means of two pivotally-mounted levers 80 and 81, that are provided, respectively, with adjustable poises 82 and 83, and the counterpoise-weights are barely sufficient to maintain the funnel in elevated position, so that the exact weight is necessary to force the funnel down until its lower end enters the mouth of the bottle. When the secondary-bucket 54 moves to discharging position, its discharge end, which is preferably tubular in form, enters the funnel and depresses the latter, and the liquid then commences to flow from the secondary bucket into the bottle. The discharging movement of the bucket 54 commences slightly before the final weight is received, for the liquid is flowing into said bucket through the duct formed by the primary bucket 48, and continues to flow during a portion of the upward movement of said bucket 48. The parts are accurately adjusted, so that by the time the flow is shut off from the bucket 48 the secondary bucket 54 will have received the final load to be emptied into the bottle. The parts are so related that the bucket 54 will remain in discharging position and the funnel 55 will be held down until all of the liquid has discharged from said bucket 54, whereupon the counterpoise members of said bucket will restore the same to its initial approximately horizontal position, and in so doing a loop or eye 86, carried by the bucket, will engage against an adjustable stop 87, carried by a rod 88, the lower end of which is connected to the lever 80, and will start the return movement of the funnel 35 toward its elevated position.

With an apparatus constructed in accordance with this invention liquid of any kind or materials in powdered or other form may be accurately weighed into charges, so that each bottle will receive precisely the same weight of material, and the operation of the machine is very rapid, owing to the fact that one charge is accumulating while the previous charge is being emptied into a bottle. The mechanism is entirely automatic in its nature, and the speed of operation may be accurately controlled by simply regulating the amount of material allowed to pass in a given time through the pipe 19.

While the term "bottle" has been used in the majority of the claims to describe the container into which the load is to be delivered, it is to be understood that this term is to be construed as to include any receptacle, bucket, or container.

I claim—

1. In a bottle-filling machine, a bottle-carrier arranged to present successive bottles to loading position, a carrier-actuating means, a charge-weighing mechanism including primary and secondary load-receptacles, and means under the control of the primary receptacle for permitting step-by-step movement of the bottle-carrier-actuating means.

2. In a bottle-filling machine, a bottle-carrier for presenting successive bottles to loading position, a carrier-actuating means, a charge-weighing device including primary and secondary receptacles, the primary receptacle being arranged to receive less than a complete load, and to dump the same into the secondary receptacle, and means actuated by said primary receptacle for controlling the movements of the bottle-carrier.

3. In a machine of the class described, the combination with primary and secondary load-receivers, the primary receiver being arranged to discharge into the secondary receiver under less than a full load and remaining in such discharging position until the completion of the final load in the secondary load-receiver, means for directing material to be weighed into said primary receiver, and means operated by tilting of the secondary load-receptacle for restoring the primary load-receiver to initial position.

4. In a device of the class described, the combination with primary and secondary load-receivers, the primary receiver being arranged to move to discharging position under less than a full load, and to remain in discharging position until the completion of the final load in the secondary receiver, means for directing an uninterrupted stream of material into the primary receptacle, and means operated by tilting of the secondary load-receptacle for restoring the primary load-receiver to initial position.

5. In a machine of the class described, a main load-receiver movable to discharge position under the final weight, a primary load-receiver movable to discharge into the main receiver under less than the final weight, means for holding the primary receiver in discharging position after its contents have been fully discharged, and employing the primary receiver as a conveyer for directing additional material into the main receiver, and means operable by the tilting movement of the main receiver for restoring the primary receiver to initial position.

6. In a machine of the class described, the combination with primary and secondary load-receivers, of which the primary receiver is movable to discharging position under less than a complete load, and a movable weight carried by the primary receiver and serving to shift the center of gravity of said primary receiver and maintain the same in discharging position.

7. In a machine of the class described, primary and secondary load-receivers, means for directing a continuous uninterrupted stream of material into the primary receiver, said primary receiver being arranged to move to discharging position under less than a complete load, and a movable weight for retaining said primary receiver in discharging position until the final load has accumulated in the secondary receiver.

8. In a machine of the class described, primary and secondary load-receivers, of which the primary receiver is arranged to move to discharging position under less than a complete load and discharge its contents into the secondary receiver, means for directing a continuous uninterrupted stream of material into the primary receiver, and a shifting weight arranged to move to the discharge side of the primary receiver when the latter tilts, said weight holding the receiver in discharging position until the accumulation of a complete load in the secondary receiver.

9. In a machine of the class described, the combination with primary and secondary load-receivers, of which the primary receiver is movable to discharging position under less than a complete load, said primary receiver serving as a conveyer for directing the remaining portion of a complete load to the secondary receiver, and means operable by secondary receiver on movement to discharging position for restoring the primary receiver to initial position.

10. In a machine of the class described, an automatic means for successively moving containers to load-receiving position, primary and secondary load-receivers, of which the primary receiver is arranged to move to discharging position under less than a complete load, means operable from the primary receiver for controlling the operation of the container-moving mechanism, and a movable funnel for directing the contents of the secondary receiver into the successive containers.

11. In a machine of the class described, means for successively moving containers to load-receiving position, a counterbalanced funnel normally held in elevated position above the container, and a load-receiver arranged on movement to discharge position to engage with and depress said funnel.

12. In a machine of the class described, the combination with a tiltable load-receiver, of a funnel for directing the contents of the load-receiver into a container, and a counterpoise means normally holding said funnel in elevated position above the container.

13. In a machine of the class described, a vertically-movable funnel, means for maintaining the same in elevated position, and a tiltable load-receiver arranged to engage and depress the funnel on discharge movement of said load-receiver.

14. In a machine of the class described, a vertically-guided funnel, a counterbalanced means normally maintaining the funnel in elevated position, a tiltable load-receiver for depressing said funnel, an eye thereon, a rod connected to the counterbalance means, and extending through the eye on the load-receiver, and a stop carried by said rod and arranged to be engaged by the eye when the receiver returns to load-receiving position.

15. In a machine of the class described, a revoluble container-carrier including a disk, pins projecting from the periphery of the disk, a rock-shaft, a flanged disk supported thereby and provided with an opening for the passage of the successive pins, and a strip carried by said flange and forming a guard for engagement by successive pins, and a charge-weighing mechanism operatively connected to said rock-shaft.

In testimony that I claim the foregoing as my own I have hereto affixed my signature in the presence of two witnesses.

ELI B. CRAMBLIT.

Witnesses:
N. A. MANNING,
E. J. PENFIELD.